United States Patent [19]

Mills et al.

[11] 3,847,623

[45] Nov. 12, 1974

[54] OIL FOR USE IN PRINTING INKS

[75] Inventors: Ivor W. Mills, Media; Glenn R. Dimeler; William A. Atkinson, Jr., both of West Chester, all of Pa.; James P. Hoffman, Yabucoa, P.R.

[73] Assignee: Sun Oil Company of Pennsylvania, Philadelphia, Pa.

[22] Filed: June 21, 1972

[21] Appl. No.: 240,810

Related U.S. Application Data

[63] Continuation-in-part of Ser. No. 850,778, Aug. 18, 1969, Pat. No. 3,654,127.

[52] U.S. Cl..................... 106/32, 106/31, 106/285, 106/311, 208/14, 208/264
[51] Int. Cl............................................ C09d 11/00
[58] Field of Search ............... 106/32, 285, 31, 311; 208/14, 264

[56] References Cited
UNITED STATES PATENTS

| | | | |
|---|---|---|---|
| 2,852,398 | 9/1968 | Goessling | 106/32 X |
| 2,967,782 | 1/1961 | Manley | 106/32 X |
| 3,330,673 | 7/1967 | Voet et al. | 106/32 |
| 3,619,414 | 11/1971 | Mills et al. | 208/14 X |
| 3,654,127 | 4/1972 | Mills et al. | 208/14 |
| 3,681,233 | 8/1972 | Mills et al. | 208/14 X |
| 3,706,653 | 12/1972 | Mills et al. | 208/14 X |

*Primary Examiner*—Joseph L. Schofer
*Assistant Examiner*—T. S. Gron
*Attorney, Agent, or Firm*—George L. Church; J. Edward Hess; Barry A. Bisson

[57] ABSTRACT

An improved ink oil is prepared by a process wherein a topped naphthenic or mildly aromatic crude is heated and flash distilled under vacuum in a first distillation step to remove gas oil and lubricating oil fractions and a heavy residuum containing asphaltic and/or high molecular weight naphthenic acid components is obtained, and (a) subjecting said heavy residuum to vacuum distillation in a second distillation step at a pressure lower than that to which the residuum was subjected in said first distillation step; (b) separating from the second distillation step a heavy distillate having an initial ASTM D-1500 color greater than 7.5, SUS viscosity at 100°F. in the range of 8100–14,000 SUS, a 260 UVA greater than 12.0 (and, typically containing high molecular weight naphthenic acids); (c) catalytically hydrogenating said heavy distillate at a temperature in the range of 500°–775°F., with $H_2$ of 50–100% purity, and from 800–3000 p.s.i. of hydrogen at the reactor inlet (at total pressures from 800–6000 p.s.i.g.) at a fresh feed liquid hourly space velocity (LHSV) of from 0.1–8.0; and (d) recovering hydrogenated oil useful as a printing ink oil and having an initial ASTM D-1500 color no greater than 2.5, a viscosity in the range of 5000–12,000 SUS at 100°F., an API gravity at 60°F. in the range of 15.5–18.5, a refractive index in the range of 1.51–1.53, a 260 UVA less than 10.0, a flash point above 425°F., a pour point greater than 10°F. and which contains at least 40 wt. % gel aromatics.

11 Claims, No Drawings

OIL FOR USE IN PRINTING INKS

CROSS REFERENCES TO RELATED APPLICATIONS

The present application is a continuation-in-part of our application Ser. No. 850,778, filed Aug. 18, 1969, which issued as U.S. Pat. No. 3,654,127 on Apr. 4, 1972. The application is also related to the following listed applications:

| Serial No. | Filing Date | Title |
| --- | --- | --- |
| 622,398 (now U.S. 3,462,358, issued 8-19-69) | 3-13-67 | "Clay Treatment of Hydrorefined Oils" - Ivor W. Mills, Glenn R. Dimeler |
| 652,026 (now U.S. 3,502,567, issued 3-24-70) | 7-10-67 | "Process For Producing Cable Oils by Sequential Refining Steps" - Ivor W. Mills, Glenn R. Dimeler |
| 636,493 (now U.S. 3,681,279, issued 8-1-72) | 5-5-67 | "Process for Preparing an Aromatic Discoloring Rubber Composition Containing Said Oil" - Ivor W. Mills, Glenn R. Dimeler, Merritt C. Kirk, Jr. |
| 730,999 | 5-22-68 | "Hydorefined Transformer Oil and Process of Manufacture" - Ivor W. Mills, Glenn R. Dimeler |
| 812,516 (now U.S. 3,619,414 issued Nov. 9, 1971) | 2-19-69 | "Catalytic Hydrofinishing of Petroleum Distillates in the Lubricating Oil Boiling Range" - Ivor W. Mills, Glenn R. Dimeler, Merritt C. Kirk, Jr., Albert T. Olenzak |
| 850,779 (now U.S. 3,586,752 issued June 22, 1971) | 8-18-69 | "Electrical Conduit Containing Hydrorefined Oil" - Ivor W. Mills, Glenn R. Dimeler, John J. Melchiore |
| 850,717 (now abandoned) | 8-18-69 | "Hydrorefined Lube Oil and Process of Manufacture" - Ivor W. Mills, Glenn R. Dimeler |
| 850,716 (now abandoned) | 8-18-69 | "Blended Hydrocarbon Oil and Process of Manufacture" - Ivor W. Mills, Glenn R. Dimeler |
| 228,832 | 2-24-72 | "Hydrorefined Lube Oil and Process of Manufacture" - Ivor W. Mills, Glenn R. Dimeler |

The disclosure of all of the above referred to applications is hereby incorporated herein by reference, particularly as to disclosure therein directed to hydrorefined oils in the lube viscosity range, to uses of such oils, and to the production of such oils.

All of the above-referred to applications contain disclosure relating to conditions which can be used to produce severely hydrorefined petroleum distillate in the lubricating oil viscosity range.

BACKGROUND OF THE INVENTION

Printing ink is a mixture of coloring matter dissolved or, in the case of newspaper inks, dispersed in a carrier to form a fluid or paste. The colorants are pigments and dyes while the vehicle or carrier may range from a light petroleum solvent to heavy mineral oils. In addition, large volumes of ink are based on drying oils such as linseed or dehydrated castor oil and, as such, do not use mineral oils.

One way of classifying printing methods is to determine whether the ink is above, on, or under the surface from which it is applied. In the typrographic process raised type is used. This method is known also as letterpress or relief printing. When the ink is on the plane of the applying surface it is called planographic or lithographic printing. In the last case, the ink is applied from depressions into which paper is forced. This is the intaglio process represented by engraved or incised plates.

Letterpresses (for typrography) vary from slow handfed flatbed machines to high speed rotary and cylinder newspaper presses. These presses represent by far the largest number of the types in use. The inks used with much of this equipment are oil-based. The rotaries use a cylindrical cast as the type form and such a rotating type face can turn out copies at a much faster rate than a flat bed hand loaded press. The typographic method excels in the reproduction of letters and characters and thus its use is widespread in printing newspapers, books, catalogs, etc.

Lithography takes its name from the original process in which inked designs were drawn on limestone. Moisture is applied to prevent ink spreading over the stone and causing smudging. Zinc and aluminum "litho" plates are now used as the transfer medium and high quality reproductions can be produced without distortion (a vital requirement in maps, etc.).

At the other extreme, offset lithography excels in printing cheap papers and in much metal printing. In this technique, the printing material is transferred from a "plate" cylinder carrying it to a "blanket" cylinder and from this to paper running between the latter and a so-called "impression" cylinder. The blanket cylinder has a fabric base covering which is surfaced with a skimcoating of rubber. Since it is this rubber which receives and transmits the printing, it is essential that the ink have as little effect on the rubber as possible. This severely restricts the amount and type of mineral oils that can go into inks for use in offset printing.

The intaglio procedure transfers ink through a depressed rather than a raised metal pattern and is, thus, the exact opposite of typography. The system is more properly known as gravure and involves preparing a metal plate with a series of cells varying in depth and diameter. By reducing cell size, sharper images are obtained. The amount of ink transferred determines the intensity of printing area and depends on cell depth. Printing plates in the gravure process are either cylindrical or flat. Generally they are made by a photographic method which is referred to as photogravure or rotogravure. Low viscosity inks are required. Another method of intaglio printing is by means of copper and steel plate engraving. Bank notes, for example, are printed this way. Such printing requires high viscosity drying oil inks.

With the many types of printing methods currently in use, a variety of printing inks are required. The inks can be broken down into those based on mineral oils and those using other vehicles.

The latter category appears to be based on a varnish technology similar to that in the protective coatings field. Both natural and synthetic resins are or have been used with drying oils. Coloring is through organic dyes or inorganic pigments. Aliphatic and aromatic petroleum solvents are used. The former include light naphthas, selected spirit cuts, etc. Because of toxicity, aromatic solvents are employed in relatively small amounts to increase solubility rather than as a viscosity adjuster or main solvent. Inks employing solvents dry by solvent removal either by rapid evaporation or forced drying. Non-hydrocarbon materials such as alcohols, glycols, ethers, etc. can also be used.

In the area of solvent inks, mention should be made of the so-called Magie oils. These are closely cut petroleum fractions which are apparently used either directly as solvents for pigmented resins, or as conventional solvents with varnish inks. These inks are used mainly as lithographic inks.

Mineral oil inks are used almost exclusively in newsprint, where they dry by penetration into absorbent stock. In addition to the oil, they contain printing grade carbon blacks (or, for colored ink, dyes and/or pigments) and sometimes a little rosin or other resin. Letterpress printing consumes large volumes of these inks.

Price is a prime factor in most news inks and dictates what oils can be used. Therefore, the most commonly used in carbon black inks are the naphthenic oils, since solvent refined oils are too expensive in most such applications.

Naphthenic oils also have desirable rubber swell characteristics. Being intermediate in composition between solvent refined paraffinic oils and highly aromatic oils, the naphthenic oils represent an optimum balance of properties. Their composition enables good wetting and dispersion of pigments without excessive swelling of rubber rolls which the inks may contact. Odor is critical in ink oil applications and, thus, the oil should have low volatility. Because ink oils are exposed to low temperatures in transit or storage, it is necessary that they be wax free. The low pour point of high V.G.C. naphthenic oils makes them more desirable than paraffinic oils.

Currently most high speed printing inks use medium viscosity oils of 700–800 SUS at 100°F., which mainly contain naphthenic distillate or residuum and can contain small amounts of paraffinic oils. In some printing processes, however, other viscosities are required. In order to provide for a wide range of viscosities, printing ink manufacturers will stock a naphthenic distillate having an SUS viscosity at 100°F. in the range of 4000–8000 (e.g., 6000 SUS, such as "Circosol 5600") to provide a blending stock. Some applications can utilize very high viscosity oils (e.g., 150–1000 SUS at 210°F.) which are good wetting agents and can impart desirable flow characteristics and "length" to inks.

Many news inks utilize a high viscosity ink oil in the formulation to give the finished ink the proper "length" or flow.

This property of "length" is subjective and is measured by comparison with a standard. Measured samples of the test inks are placed on a plate which is then inclined to a 45° angle. The ink which runs further down the incline is said to have better "length". The "long" inks are preferable to those with a buttery consistancy.

Such screening can use the following formulation and procedure:

| | |
|---|---|
| 6% | Test Oil |
| 10% | Cabot Elftex No. 8 Carbon Black |
| 84% | Sun Ink Oil 31 (i.e., "Sunprint 31") |

Mix Ink Oil 31 and test oil in a Waring Blender and slowly add the Carbon Black. Blend until dispersion is complete.

Two "standard" length oils, which can be used for comparison are "Coblax 160" of Humble Oil and "Circomar 6500" of Sun Oil. Table 1 represents typical properties of "Circomar 6500" (Oil 4) and "Sunprint 31" (Oil 5). In addition to the test for length described above viscosity is tested by the Brookfield (or other rotating disc method suitable for non-Newtonian fluids) at various disc speeds. The ink made with the test lengthener should have about the same viscosity as the control ink (using a "standard" lengthener). The wetting properties or ability to impart length of ink oils are not fully understood, but may be related to crude source or to asphaltines, polar compounds or other minor constituents of the ink oil. In general, a high viscosity "lengthener" ink oil can have an SUS viscosity at 210°F. in the range of 100–1200 (typically 150–250). The high viscosity ink oil of the present invention is satisfactory in colored news inks and in specialized color applications.

In application Ser. No. 622,398, now U.S. Pat. No. 3,462,358, a process is claimed for producing an improved cable oil having an ASTM D-1934 aged dissipation factor (ADF) below 0.010 in the absence of added oxidation inhibitors. from a hydrogenated naphthenic oil having a viscosity in the range of 500–2000 SUS at 100°F., an ultraviolet absorbency (UVA) less than 8 at 260 millimicrons and having an ADF greater than 0.015, comprising contacting said oil at a temperature in the range of 100°–400°F. with an adsorbent comprising an acid-activated adsorbent clay in an amount per barrel of oil such that from 10–90 grams of KOH would be required to neutralize the acidity of the acid-activated adsorbent clay. Also claimed is a naphthenic electrical oil having a viscosity in the range of 500–2000 SUS at 100°F., having an ADF less than 0.010 in the absence of added oxidation inhibitors, and which requires at least 75 hours at PFVO test conditions to reach a 6% power factor. It was further disclosed that, in the case of the high viscosity cable oils (4000–6000 SUS at 100°F.), a relatively inexpensive fuller's earth bleaching clay was preferred as the adsorbent for such a hydrorefined oil and that the dosage of clay was not particularly critical insofar as the ADF of the resulting cable oil was concerned.

Also disclosed were hydrogenation conditions and catalysts which could be used to severely hydrorefine distillate oils in the lubricating oil viscosity range (35 and higher SUS at 100°F.). It was further disclosed that such severe hydrogenation should be conducted so that the 260 UVA of the feed to the hydrogenation step be reduced at least 40%.

Further disclosed in said application, by example, was that the degree of nitrogen removal caused by the severe hydroregining can vary according to the viscosity of the charge oil (an oil having a viscosity of 107 SUS and containing 170 p.p.m. N produced an oil containing 47 p.p.m. N; whereas, an oil having a viscosity of 2901 SUS and containing 467 p.p.m. of N produced, under the same hydrogenation conditions, an oil containing 313 p.p.m. of N). Ser. No. 652,026 (now U.S. Pat. No. 3,502,567), a continuation-in-part of said Ser. No. 622,398, discloses hydrorefined naphthenic electrical insulation oils having a viscosity in the range of 3000–8000 SUS at 100°F.

Although the art has produced heavy oils having a viscosity greater than 8000 SUS at 100°F., the usual source of such oils is the extract portion from highly viscous distillate oils or from the residuum from crude oil distillation (the extraction being with an aromatic selective solvent, such as furfural). Such extracts are generally higher in aromatic hydrocarbons and more dark in color than the charge to the extraction.

Such prior art high viscosity oils are useful in grease compounding or in ink oils but have been unsuitable for many uses. For example, such heavy oils (except for those of Ser. No. 652,026) are too highly colored to be satisfactory as plasticizers in light-colored rubber compositions or in colored printing inks.

The prior art has heretofore been unable to process heavy residuum from vacuum distillation of a topped naphthenic crude and produce an oil having an initial ASTM D-1500 color less than 2.5, a viscosity in the range of 5000–12,000 SUS at 100°F., an API gravity at 60°F. in the range of 15.5–18.5, a refractive index in the range of 1.51–1.53, a 260 UVA less than 10.0, a flash point above 425°F., a pour point greater than 10°F. and containing at least 40 weight % gel aromatics. Such an oil is useful as a plasticizer for rubber compositions and as an oil for use in printing inks (particularly, for lengthening colored printing inks).

Additionally, the prior art has been unable to process a residuum or a high viscosity distillate and obtain an oil containing from 30–65 weight % aromatics, having a viscosity in the range of 8100–12,000 SUS at 100°F. and which also has an ASTM D-1500 initial color no greater than 2.5, an initial ASTM D-924 power factor at 100°C. of no more than 0.01, an aged (with copper) ASTM D-1934 power factor at 100° C. no greater than 0.030, and an ASTM D-92 flash point of at least 500°F. Such an oil is useful as an electrical insulation medium or as an oil for use in printing inks.

BRIEF SUMMARY OF THE INVENTION

It has been discovered that heavy residuum from the vacuum distillation of a topped naphthenic or mildly aromatic crude can be subjected to vacuum distillation in a second distillation step at a pressure lower than that to which the residuum was subjected in said first distillation step, and from said second distillation step a heavy distillate can be separated having an initial ASTM D-1500 color greater than 7.5, SUS viscosity at 100°F. in the range of 8100–14,000, a 260 UVA greater than 12.0 and containing high molecular weight naphthenic acids, and/or asphaltic components. This highly colored, highly viscous heavy distillate can then be catalytically hydrogenated under conditions and with catalysts which are described hereinafter, and a hydrogenated oil can be recovered which has an initial ASTM D-1500 color less than 2.5, a viscosity in the range of 5000–12,000 SUS at 100°F., an API gravity at 62°F. in the range of 15.5–18.5, a refractive index in the range of 1.51–1.53, a 260 UVA less than 10.0, a flash point above 425°F., a pour point greater than 10°F. and containing at least 40 weight % gel aromatics and which is useful in printing inks. This oil will typically have an ASTM D-924 initial power factor at 100°C which is greater than 0.01 and will have an aged (with Cu) ASTM D-1934 power factor at 100°C greater than 0.030. It can contain in the range of 100–2000 ppm of basic nitrogen (typically about 500).

This process can also be used to produce a novel hydrogenated oil, useful in printing inks and containing from 30–65 weight % of gel aromatics, having a viscosity in the range of 8100–12,000 SUS at 100°F. and which by Engler distillation has a 5% point of at least 825°F., a 50% point of at least 925°F., a 90% point of at least 975°F. and an ASTM D-1500 initial color no greater than 2.5. More preferred, the oil can have an initial ASTM D-924 power factor at 100°C. of no more than 0.01, an aged (with copper) ASTM D-1934 power factor at 100°C. no greater than 0.030 and an ASTM D-92 flash point of at least 500°F.

One novel hydrogenated oil, useful as an ink oil, has an initial ASTM D-1500 color less than 2.5, and aged 16 hours, less than 6.0, a viscosity in the range of 8100–12,000 SUS at 100°F., (and preferably about 150–200 SUS at 210°F.), an API gravity at 60°F. in the range of 15.5–19.0, a refractive index in the range of 1.51–1.53, a 260 UVA less than 10.0, a flash point above 425°F., a pour point less than 30°F., a viscosity gravity constant in the range of 0.84–0.92 and contains at least 40 weight % gel aromatics.

Such a hydrogenated oil can be further processed as with an adsorbent, such as an acid-activated adsorbent clay or a mixture of a acid-activated and attapulgite clays or with a mineral acid, in order to further improve the electrical properties of the oil. Such additional processing can be used to produce an oil having a viscosity in the range of 5000–12,000 SUS at 100°F., and which also shows satisfactory electrical properties (including a stability under use conditions) for most uses as an insulating medium (particularly when the usual oxidation inhibitors, such as from 0.1–0.5 percent of DBPC are added to the oil).

However, it has been also found that the usual contacting with sulfuric acid or with attapulgite or acid-activated clays is not sufficient to reduce the basic nitrogen content of such oils to less than 5 p.p.m. An oil having a basic nitrogen as low as 8 p.p.m. can be obtained when the heavy distillate from the heavy residuum is contacted with 40 lbs. per barrel of $H_2SO_4$, and the resulting acid-contacted (and neutralized) oil is hydrogenated. However, to obtain an oil having less than 5 p.p.m. of basic nitrogen (and more preferably less than 2 p.p.m.), it has been discovered that the heavy distillate from the heavy residuum should be first contacted with from 5–100 lbs/bbl of $H_2SO_4$ (typically 50–80 lb/bbl) and then hydrogenated under the conditions disclosed hereinafter, following which the resulting hydrogenated oil should be contacted with from 5–30 lbs/bbl of acid-activated clay. For an oil having an ADF at 100°F. below 0.0035 further adsorbent contacting, particularly with from 5–30 lbs/bbl of attapulgite, is required. A single adsorbent contacting step with a mixture of acid-activated and fuller's earth bleaching clays can also be used to produce such high viscosity cable oils having an ADF (with copper) at 100°F. of less than 0.0035.

An alternative procedure involves sulfuric acid contacting of the heavy distillate from the heavy residuum followed by contacting with clay (preferably a mixture of attapulgite and acid-activated clay) and then hydrogenation. The resulting hydrogenated oil can be finished by adsorbent contact, as with attapulgite, alumina, etc. The dosages of acid and adsorbent are chosen such that the final oil contains less than 5 p.p.m. of basic nitrogen.

FURTHER DESCRIPTION OF THE INVENTION

Petroleum fractions (e.g., distillates, extracts, raffinates, reformer bottoms, cycle oil fractions, etc.) in the lubrication oil viscosity range (35–14,000 SUS at 100°F.) can be severely hydrorefined (e.g., at 600°F., 1200 p.s.i.g. of 80% hydrogen, 0.3 LHSV, presulfided Ni-Mo oxide catalyst) to produce a hydrogenated oil having a lighter ASTM color, a lower (by at least 40%) ultraviolet absorptivity at 260 millimicrons and containing appreciably less total nitrogen (and, if desired, lower gel aromatics) than was in the charge to the hydrorefining stage.

With some charges, such as paraffinic distillates, dewaxing and/or deasphalting can be advantageous prior to hydrorefining. Preferably, to insure longer catalyst life and to reduce hydrogen consumption, when the petroleum fraction is derived from a stock containing naphthenic acids, such acids should be removed (or substantially reduced) prior to hydrorefining as by the processes disclosed in the following U.S. Pat. Nos. 1,603,174; 2,770,580; 2,795,532; 2,966,456; and 3,080,312.

When the charge stock is a naphthenic or aromatic distillate (including a raffinate or extract product from solvent extraction of a naphthenic distillate), having a viscosity greater than about 100 SUS, severe hydrogenation in a single stage, as to an ultraviolet absorptivity at 260 millimicrons (i.e., 260 UVA) in the range of 3 for a 150 SUS oil, cannot economically be used to reduce the basic nitrogen content below about 10 p.p.m., nor the total nitrogen content below about 20 p.p.m. Both the total and the basic nitrogen contents of such hydrorefined oils typically are greater as the viscosity of the oil increases. This is probably due to less efficient utilization of the hydrogen caused by the hindering effect of the larger oil molecules on hydrogen diffusion.

For many uses (as in dark colored rubber vulcanizates or in inks containing carbon black or in electrical cables where the oil is not in contact with Kraft paper) such severely hydrorefined oils exhibit satisfactory performance even at high levels of total and "basic" nitrogen.

The phrase "total nitrogen" refers to the nitrogen content of an oil as determined by such methods as that of P. Gouverneur, *Anal. Chim. Acta*, 26 (1962) 212 or, more preferred, the modified Gouverneur method described by Smith, A. J. et al. in *Anal. Chim. Acta*, 40 (1968) 341–343.

The phrase "basic nitrogen" refers to those nitrogen compounds present in crudes, petroleum distillates and residues which hava a basic ionization constant, $K_b$, greater than $10^{-12}$. A preferred analytic method for determining the content of such basic nitrogen compounds in hydrorefined oils in the lube oil viscosity range is disclosed in U.S. Pat. No. 3,654,127 and involves dissolving a sample of the oil in an appropriate solvent and potentiometrically titrating the solution with perchloric acid in acetic acid.

The phrases "severe hydrorefining" or "hydrogenation" refer to processes conducted in the presence of a hydrogenation catalyst at from about 500–775°F., with hydrogen of 50–100% purity, and from 800–3000 p.s.i. of hydrogen at the reactor inlet (at total pressures from 800–6000 p.s.i.g.) at a fresh feed liquid hourly space velocity) (LHSV) of from 0.1–8.0 (usually below 2.0), preferably conducted either in vapor phase or trickle phase. Such hydrogenation or severe hydrorefining is to be distinguished from hydrocracking in that the production of "overhead" (i.e., hydrocarbons boiling below 485°F.) is less than 25% by volume per pass through the reactor (and, typically, less than 10%). Product recycle, for example, as in U.S. Pat. No. 2,900,433 can be used to increase severity. Recycle liquid hourly space velocity can vary from 0 to 20; however, we prefer to operate at total liquid throughputs that obtain at greater than 25% of flooding velocity and more preferably at from 40–98% of flooding velocity.

Preferably, the temperature is below that at which substantial cracking occurs, that is, no more than 20 weight percent (preferably less than 10%) of the feed stock is converted to material boiling below 300°F. in a single pass through the reactor. Although the maximum hydrogenation temperature which will not produce substantial cracking is somewhat dependent upon the space velocity, the type of catalyst and the pressure, generally it is below 750°F. but can be as high as 785°F. To allow a margin or safety, we prefer to operate below 700°F. (except when it is desired to obtain a hydrogenated oil containing more gel aromatics than are in the charge.) At total pressures below about 2000 p.s.i. we prefer a temperature below about 660°F., since above that temperature the degradation of oil viscosity can become large.

Typical of such severe hydrorefining methods, when conducted within the aforementioned processing conditions, are those of U.S. Pat. Nos. 2,968,614; 2,993,855; 3,012,963; 3,114,701; 3,144,404 and 3,278,420; and those of the previously referred to copending applications, Ser. Nos. 622,398; 652,026; 636,493; 730,999 and 812,516. The terms "severely hydrorefined oil" or "hydrogenated oil" include the products within the lubricating oil boiling range, of such severe hydrorefining or hydrogenation. One characteristic of a severely hydrorefined or hydrogenated oil is that the ratio of monocyclic aromatics to polycyclic aromatics is significantly greater than in hydrotreated oils or conventional distillate oils.

Naphthenic oils have a VGC in the range of 0.820 to 0.899 and the preferred hydrorefined naphthenic oils have a VGC in the range of 0.850 to 0.899. Hydrorefined, relatively aromatic oils, having a VGC in the range of 0.900 to 0.920, can sometimes be used as a whole or partial substitute for the hydrorefined naphthenic lube. Aromatic oils (including hydrorefined or hydroaromaticized oils) having a VGC in the range of 0.921 to 1.050 and greater, can be useful in minor proportions (e.g., 1–20%) for adjusting the aniline point of the base oil, particularly when the base oil contains a high proportion of a high VI hydrocracked paraffinic oil.

Where as in the present invention, the desired hydrorefined oil is to be of the naphthenic class, a preferred charge to the hydrogenation reactor can be obtained by vacuum distillation of naphthenic or "mildly aromatic" crude oils (as in U.S. Pat. No. 3,184,396), especially those crude oils wherein the 1500–3000 SUS (at 100°F.) distillate fractions have viscosity-gravity constants from 0.84 to 0.92. Usually materials boiling below about 600°F. (including residual $H_2S$, $NH_3$, etc.) are removed from the hydrorefined oils, as by atmospheric distillation (and the viscosity can also be adjusted by choice of distillation end point).

The viscosity of the base oil, or of the final hydrorefined oil, can be adjusted by the addition of other oils of higher or lower viscosity and which are within the lube oil boiling range. For example, a preferred ink oil having a viscosity at 210°F. in the range of 140–160 SUS can be obtained by blending hydrogenated oil of the present invention having a viscosity of about 175 SUS at 210°F. (and about 8900 SUS at 100°F.) with hydrogenated oil having a viscosity of about 130 SUS at 210°F. and about 5000 SUS at 100°F.

ILLUSTRATIVE EXAMPLES

Example 1

A residuum was obtained from the distillation of a naphthenic crude (VGC of 0.89) by the caustic distillation process described in U.S. Pat. No. 3,184,396. This residuum was distilled under a lower pressure than that used in the first distillation and a 35 volume % overhead fraction (viscosity 13,000 SUS at 100°F. and 200 SUS at 210°F.) was recovered. This overhead will be referred to hereinafter as "heavy distillate from heavy residuum" or by the abbreviation "HDFHR". The HDFHR was hydrorefined, in the presence of a sulfided Ni-Mo oxide catalyst, at a temperature of about 605°F., 1140 p.s.i.g. total pressure (about 75% $H_2$ at reactor inlet), at a 7 to 1 volume ratio of recycle to charge and with a reactor gas bleed of 18,000 scfh. The hydrogenated product (95 volume % yield) had a viscosity at 100°F. of 8850 SUS and 170 SUS at 210°F. This hydrogenated oil has an initial ASTM color of 2.0 and is useful as an ink oil. The oil remained stable in color if stored at temperatures below 130°F. when contacted with 10 lb/bbl of $H_2SO_4$, washed and neutralized and finished with 10 lb/bbl. of attapulgite. The final oil had an initial power factor (100°C.) of 0.0006 and an aged (with Cu) 100°C. power factor of 0.012 and was useful as an ink oil.

Table I herein reports typical properties for an ink oil of the present invention (Oil 1), for a commercially available "6000 SUS" ink oil (Oil 2), sold as "Circosol 5600" by Sun Oil Co., for a light colored "5000 SUS" ink oil (Oil 3) which is useful in blending with Oil 1, and for a standard "lengthener", Oil 4, sold as "Circomar 6500". Oil 5 is marketed as "Sunprint 31". All of these properties are determined by ASTM test procedures.

Example 2

76.6 Vol. % of the residuum of Example 1 was diluted with 23.4 vol. % of gas oil and the resulting blend was distilled under vacuum to obtain a gas oil-free side stream of HDFHR having about 35°F., 56 wt. % aromatics, a viscosity at 210°F. of about 200 SUS (13,000 SUS at 100°F.). The yield was about 30 vol. % based on the residuum. Upon hydrogenation (as in Example 1) the product (which was useful as an ink oil) had a 210°F. viscosity of 170 SUS and 100°F. viscosity of 8000, SUS. The yield was about 95 vol. %, Table II reports typical properties of hydrogenated "HDFHR" as made by processes as in Example 1 and 2.

Another method of producing a high quality oil (useful either as an electrical insulation medium or as an ink oil) is to contact the "HDFR" with acid and/or an adsorbent prior to the hydrogenation step. For example, the HDFHR can be contacted with 30–100 lb/bbl of 99% $H_2SO_4$ (more preferred 50–80 lb/bbl), followed by neutralization, washing and contact with an adsorbent (e.g., attapulgite, buaxite, etc.). In this treatment sequence it is frequently desirable to dilute the HDFR with a less viscous distillate (e.g., 6000 SUS at 100°F.) prior to the acid contacting.

For a very high quality electrical insulation oil, a blend of about 30 vol. % HDFR and 70 vol. % of 6000 SUS at 100° F naphthenic distillate can be hydrogenated (as in the above example), acid treated, (e.g., 70 lb/bbl of 99% $H_2SO_4$), neutralized, contacted with attapulgite (e.g., 20 lb/bbl) and then subjected to a second hydrogenation (e.g., 650°F., 1200 p.s.i.g. of 80% $H_2$, sulfided NiMo catalyst) to produce a final oil containing less than 5 ppm basic nitrogen, having a minimum viscosity at 210°F. of 100 SUS, an initial power factor (100°C.) less than 0.001 and an aged, with Cu, power factor (115°C. for 4 days) no greater than 0.01

Table I

| Typical High Viscosity Ink Oils | | | | | |
|---|---|---|---|---|---|
| | Oil 1 | Oil 2 | Oil 3 | Oil 4 | Oil 5 |
| Viscosity, SUS/100°F | 8874 | 5945 | 5047 | — | 775 |
| Viscosity, SUS/210°F. | 177 | 135 | 127 | 550 | |
| API Gravity | 17.6 | 17.3 | 19.0 | 14.0 | 19.0 |
| Flash Point, COC,°F. | 515 | 495 | 470 | 515 | 340 |
| Pour Point °F. | 20 | 20 | 20 | 60 | 0 |
| Color (D-1500) | 3.0 | 6.0 | 1.5 | Dark | 6.0 |
| Viscosity-Gravity Constant | 0.874 | 0.884 | 0.871 | 0.887 | |
| Refractive Index | 1.5223 | 1.5250 | 1.5174 | 1.5420 | |
| Aromatics, silica gel (wt. %) | 52.4 | 48.9 | 43.8 | 62.6 | |

Table I—Continued

Typical High Viscosity Ink Oils

|  | Oil 1 | Oil 2 | Oil 3 | Oil 4 | Oil 5 |
|---|---|---|---|---|---|
| Aniline Point, °F. | 192 | 183 | 193 | Too Dark | |
| Aged Color 16 hr. (ASTM D-1500) | 4.5 | 6.0 | 4.0 | | |

TABLE II

TYPICAL PROPERTIES OF HYDROGENATED HEAVY DISTILLATE FROM HEAVY RESIDUUM

| Test | ASTM Method | Typical Data A | B | Usual Range |
|---|---|---|---|---|
| Distillation* | | | | |
| Initial | | 806 | | |
| 5 | | 844 | | |
| 10 | | 868 | | |
| 20 | | 893 | | |
| 30 | | 908 | | |
| 40 | | 924 | | |
| 50 | | 943 | | |
| 60 | | 961 | | |
| 70 | | 982 | | |
| 80 | | 1002 | | |
| 90 | | 1030 | | |
| 95 | | — | | |
| E.P. | | 1030 | | |
| Rec., %: | | 90 | | |
| Gravity, °API | D-287 | 17.6 | 18.1 | 16.0–18.5 |
| Flash, COC, °F | D-92 | 515 | 525 | 500 Min. |
| Viscosity, SUS/100°F. | D-446 | 8874 | 8100 | |
| SUS/210°F. | D-446 | 176.8 | 168.1 | 165–185 |
| Pour Point, °F | D-97 | +20 | 0 | +40 Max. |
| Color, ASTM, Orig. | D-1500 | 2.75 | 2.75 | 4 Max. |
| 16 Hr. Aged | | 4.25 | 4.25 | |
| Total Acid No., mgKOH/gm | D-974 | 0.03 | 0.00 | 0.10 Max. |
| Refractive Index at 20°C | D-1747 | 1.5223 | | |
| 67°C | D-1747 | 1.5058 | | |
| Fire Pt., °F | D-92 | 580 | | |
| Ramsbottom Carbon | D-524 | 2.45 | | |
| Sulfur, Wt. % | D-129 | 0.26 | | 0.35 Max. |
| Aniline Pt., °F | D-611 | 192.0 | | |
| Aromatics, Wt. % | D-2007-65t | 52.4 | | |
| Basic Nitrogen, ppm | | 490 | 440 | |
| Power Factor/100°C Initial | D-924 | 0.0008 | 0.0013 | 0.01 Max. |
| Aged 96 Hrs., 115°C | D-1934A | 0.0130 | | 0.030 Max. |
| Aged 96 Hrs. with CU, 115°C | D-1934B | 0.0215 | 0.0325 | |
| Resistivity, Initial | 20.760 | 12.2 | | |
| Aged 96 Hrs., 115°C | | 1.903 | | |
| Aged 96 Hrs. with CU, 115°C | | 0.6400 | 0.4325 | |
| 260 UVA | | 8.4 | | 9.5–5.5 |

*Converted to atmospheric pressure from vacuum distillation

The invention claimed is:

1. A hydrogenated petroleum oil, useful as an ink oil, which contains from 30–65 weight % of gel aromatics, has a viscosity in the range of 8100–12,000 SUS at 100°F. and which by Engler distillation has a 5% point of at least 825°F., a 50 % point of at least 925°F. and a 90% point of at least 975°F., said oil having an ASTM D-1500 initial color no greater than 2.5, an ASTM D-92 flash point of at least 500°F and a viscosity-gravity constant in the range of 0.84–0.92.

2. In the manufacture of printing inks wherein a high viscosity oil is used as a lengthener, the improvement wherein said lengthener comprises the petroleum oil of claim 1.

3. A printing ink for newsprint which contains coloring matter dispersed in a carrier containing petroleum solvent or mineral oil and, as a lengthener, the petroleum oil of claim 1.

4. The oil of claim 1 wherein said viscosity-gravity constant is in the range of 0.850–0.899.

5. The oil of claim 1 wherein said oil contains more than 100 ppm of basic nitrogen and has an ASTM D-1934 aged (with copper) power factor at 100°C. which is greater than 0.030.

6. An ink containing as a lengthener therefor the oil of claim 1 wherein said oil has an initial ASTM D-924 power factor at 100°C no greater than 0.01 and an aged (with copper) ASTM D-1934 power factor at 100°C no greater than 0.030.

7. The ink of claim 3 and containing carbon black and mineral oil of lower viscosity than said lengthener.

8. The ink of claim 7 wherein said mineral oil comprises a naphthenic distillate or residuum.

9. The ink of claim 7 wherein said mineral oil has a viscosity in the range of 700 to 800 SUS at 100°F.

10. The ink of claim 3 and containing about 6% of said lengthener, and about 10% carbon black.

11. The ink of claim 10 and containing about 84% of an ink oil having a viscosity at 100°F of about 775, an API gravity of about 19.0, flash point of about 340°F, pour point of about 0°F and a D-1500 color of about 6.0.

* * * * *